United States Patent [19]
Thomason

[11] Patent Number: 5,749,209
[45] Date of Patent: May 12, 1998

[54] SINGLE LEVER HEIGHT ADJUSTMENT MECHANISM AND METHOD FOR A LAWN MOWER

[75] Inventor: Scott Thomason, Maple Heights, Ohio

[73] Assignee: MTD Products Inc. Cleveland, Ohio

[21] Appl. No.: 708,372

[22] Filed: Sep. 5, 1996

[51] Int. Cl.[6] .................................................. A01D 34/68
[52] U.S. Cl. ........................................ 56/17.2; 56/DIG. 2
[58] Field of Search .................................. 56/17.2, 17.1, 56/16.7, 221, DIG. 2, DIG. 3, DIG. 10

[56] References Cited

U.S. PATENT DOCUMENTS

| | | | |
|---|---|---|---|
| 3,972,160 | 8/1976 | Boswell | 56/17.2 X |
| 4,835,952 | 6/1989 | McLane | 56/17.2 |
| 4,905,463 | 3/1990 | Eilles | 56/17.2 |
| 5,381,648 | 1/1995 | Seegert et al. | 56/17.1 |
| 5,526,633 | 6/1996 | Strong et al. | 56/17.2 |

FOREIGN PATENT DOCUMENTS 0230223  8/1959  Australia ........................ 56/17.2

Primary Examiner—Terry Lee Melius
Attorney, Agent, or Firm—Roger D. Emerson

[57] ABSTRACT

A single lever height adjustment mechanism for adjusting the height of an associated mower has an adjustment bracket fixedly attached to the mower body, front and back pivot assemblies operatively connected to the axles of the mower, a control rod connecting the front and back pivot assemblies, an adjustment lever, and a lift assisting torsion spring. To adjust the position of the mower blade relative to the lawn, the operator moves the adjustment lever causing the back pivot assembly to raise or lower the back wheels relative to the mower body and causing the front pivot assembly to raise or lower the front wheels relative to the mower body.

21 Claims, 5 Drawing Sheets

SINGLE LEVER HEIGHT ADJUSTMENT MECHANISM AND METHOD FOR A LAWN MOWER

BACKGROUND OF THE INVENTION

1. Field of Invention

This invention pertains to the art of methods and apparatuses for use in lawn and garden care, and more specifically to methods and apparatuses for use in adjusting the height of a cutting plane of a rotary cutting blade of a lawn mower.

2. Description of the Related Art

It is well known to provide lawn mowers, such as a walk-behind lawn mower, with apparatuses and methods for adjusting the height of their cutting deck or cutting blade above the surface to be cut. It is often necessary to adjust the height of the cutting plane in order to provide the appropriate distance between a cutting or mulching blade and the grass or other vegetation which is to be cut. One common method uses an adjustment assembly at each of four wheels. The adjustment assembly comprises an adjustment bracket which is attached to the body of the mower, a pivot arm, and a lever.

A common problem often encountered in the art deals with the time and effort required to adjust the vehicle height. Typically, each of the four levers must be adjusted separately.

Another problem encountered in the art is that the levers on the front of the mower require adjustments in opposite directions to levers on the rear of the mowers. To raise the mower height, for example, it is commonly required to move the front left wheel's lever counter-clockwise and the back left wheel's lever clockwise.

Another problem encountered in the art is that the levers require substantial force to adjust, often too much force for a person to comfortably exert. Further, while a lever is being adjusted, the associated vehicle weight must be supported by the operator.

Still another problem encountered in the art is that by adjusting the height of the vehicle, the wheel base dimensions are significantly changed. For example, lowering the mower height typically requires the distance between the front wheels and the back wheels to significantly increase. This increases the mower's turning radius and makes it more unwieldy and difficult to maneuver.

The present invention provides methods and apparatuses for reducing these problems in ways which are simple and efficient, while providing better and more advantageous results.

SUMMARY OF THE INVENTION

In accordance with one aspect of the invention there is provided a single lever one axle height adjustment mechanism for adjusting the height of an associated vehicle at one axle. The vehicle has a body and an axle. The single lever one axle height adjustment mechanism has first and second adjustment brackets, first and second pivot arms, an adjustment lever, securing means for securing the adjustment lever to the first adjustment bracket, and a spring for lift assistance.

In accordance with another aspect of the invention there is provided a single lever two axle height adjustment mechanism for adjusting the height of an associated vehicle at two axles. The vehicle has a body, a front axle, and a back axle. The single lever two axle height adjustment mechanism has first and second adjustment brackets, first and second back pivot arms, first and second front pivot arms, a control rod which connects the first back pivot arm to the first front pivot arm, an adjustment lever, securing means for securing the adjustment lever to the first back adjustment bracket, and a spring for lift assistance.

In accordance with another aspect of the present invention, there is provided a method for selectively adjusting the height of an associated vehicle at one axle. An adjustment lever is positioned corresponding to the desired vehicle height. A first pivot arm pivots about a first pivot bolt then a second pivot arm pivots about a second pivot bolt. A spring force is applied to the axle to assist the height adjustment. Finally, the height of the axle relative to the body of the vehicle is adjusted.

In accordance with still another aspect of the present invention, there is provided a method for selectively adjusting the height of an associated vehicle at two axles. An adjustment lever is positioned corresponding to the desired vehicle height. A first back pivot arm pivots about a first pivot bolt then a second back pivot arm pivots about a second pivot bolt. A spring force is applied to the back axle, assisting the height adjustment. The height of the back axle relative to the body of the vehicle is adjusted. The pivoting first back pivot arm also applies a force to a control rod. The control rod transfers the force to a first front pivot arm which pivots about the front axle, rotating the front axle. As the front axle rotates it causes a second front pivot arm to pivot, adjusting the height of the vehicle at the front axle.

One advantage of the invention is that the time and effort required to adjust the vehicle height is minimized. Only one lever requires adjustment.

Another advantage of the invention is that no opposite lever adjustment is required. When the single lever is moved, all the vehicle wheels are adjusted the same way.

Another advantage of the invention is that less operator force is required. A spring is used to minimize the vehicle weight supported by the operator.

Another advantage of the invention is that the wheel base dimensions are not significantly changed when the vehicle height is adjusted. Since the front wheels and back wheels pivot in the same direction, the wheel base dimensions remain constant.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
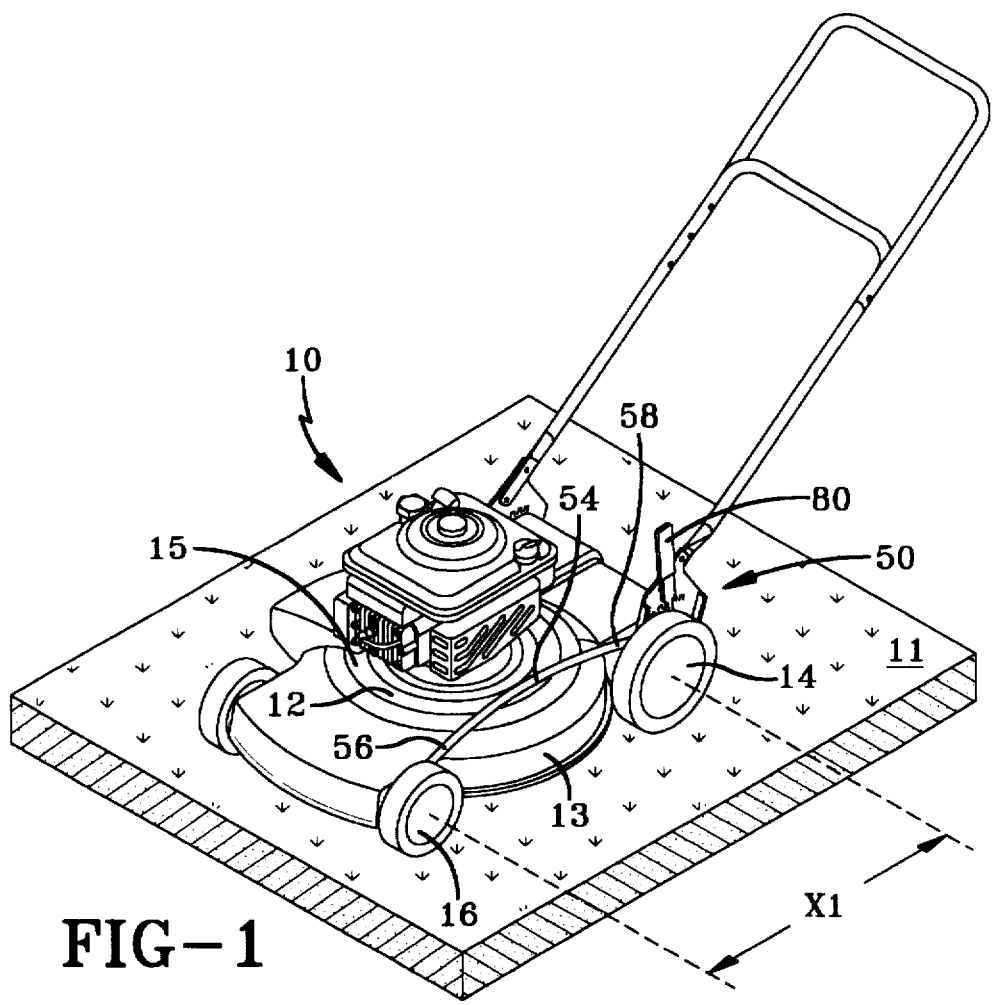
FIG. 1 shows a typical walk-behind mower using the single lever, two axle height adjustment mechanism of this invention.
Figure 2:
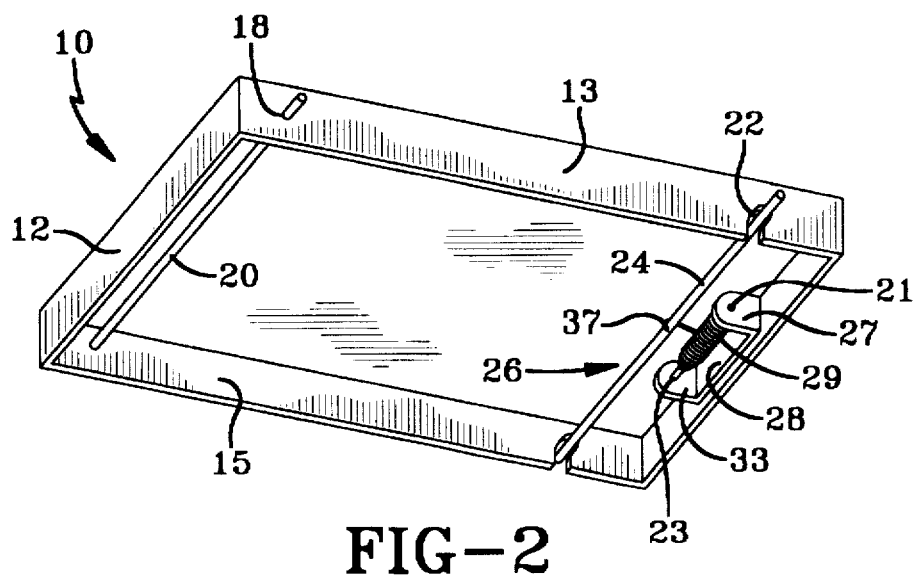
FIG. 2 is a simplified view of the mower body showing the location of the front and back axles and the spring assembly.

Referring now to the drawings wherein the showings are for purposes of illustrating a preferred embodiment of the invention only and not for purposes of limiting the same. FIGS. 1-2 show a lawn mower 10, sitting on a lawn 11, having a blade (not shown) which is equipped with one embodiment of the present invention. a single lever two axle height adjustment mechanism 50. This preferred embodiment is directed to a typical walk-behind lawn mower but the invention is applicable to riding mowers, off the road vehicles, apparatus developed for different terrains, and other applications as well. The lawn mower 10 has a body 12, back wheels 14 attached to the back axle 24, and front wheels 16. The body 12 of the lawn mower 10 has a left side 13 and a right side 15. The body 12 has front axle holes 18 for front axle 20 and back axle slots 22 for back axle 24. Back axle 24 is moveable within back axle slots 22 as will be discussed below. The distance X1 is the wheel base dimension between the center of the front wheels 16 and the center of the back wheels 14. The single lever two axle height adjustment mechanism 50 includes a front pivot assembly (shown in FIGS. 3-4) and a back pivot assembly (shown in FIG. 5). In this embodiment the single lever two axle height adjustment mechanism 50 is positioned on the left side 13 of the body 12 but it could also be placed on the right side 15 of the body 12. The single lever two axle height adjustment mechanism 50 also includes an adjustment lever 80, a control rod 54 having a front end 56 and a back end 58, and a spring assembly 26.

With reference to FIG. 2, the spring assembly 26 includes a spring bracket 27, a spring rod 28, and a torsion spring 29. The spring bracket 27 is fixedly attached to the body 12 by any means chosen with sound engineering judgment. The spring rod 28 fits into first and second spring bracket openings, 21 and 23 where it is attached by any means known in the art chosen with sound engineering judgment. The torsion spring 29 fits over the spring rod 28. The torsion spring has a first end 33 which partially wraps around the spring bracket 27 and a second end 37 which partially wraps around the back axle 24. The torsion spring 29, which is supported by the mower body 12, exerts a force on the back axle 24 providing lift assistance to the operator during the operation of the single lever two axle height adjustment mechanism 50. In this embodiment the torsion spring 29 has a spring rate of 0.7 inch pounds per angular degree but a different type of spring or a spring with a different spring rate could also be used. The spring rate of the spring should be chosen in view of the amount of assist desired.

Figure 4:
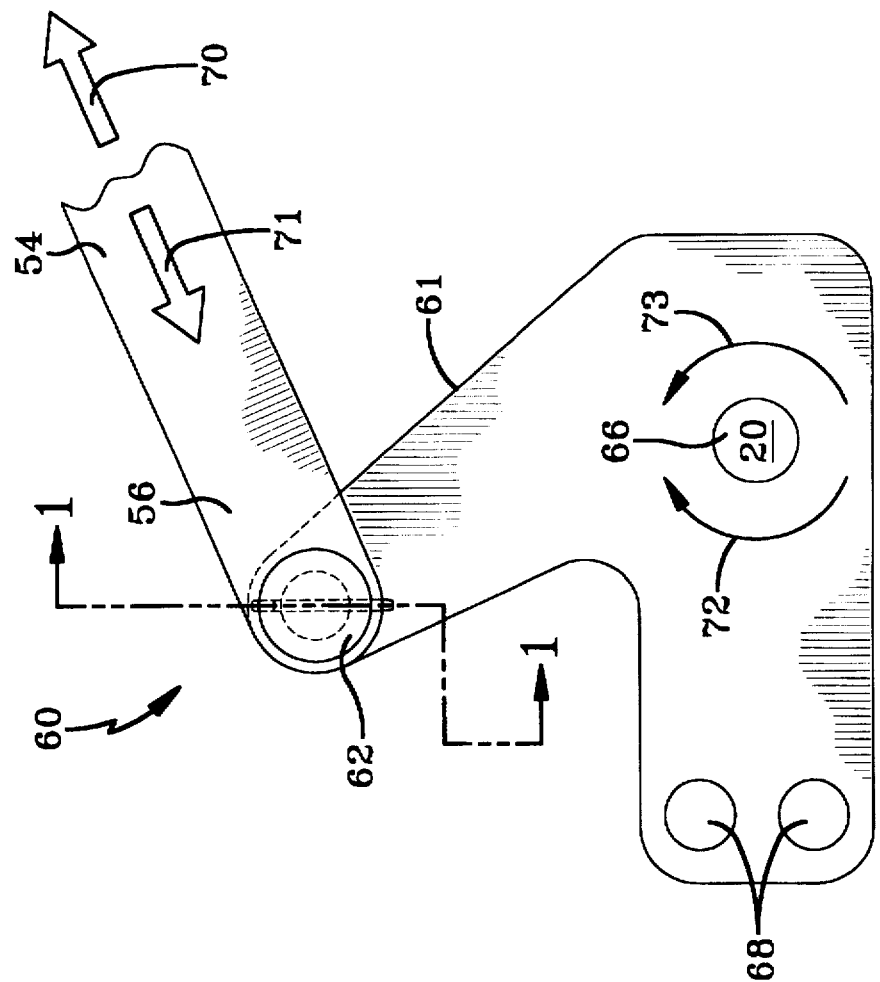
FIG. 4 shows the front pivot assembly used in this invention.
Figure 3:
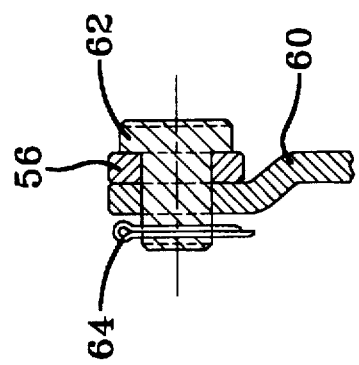
FIG. 3 is a cross-sectional view taken along the line 1—1 of FIG. 4 showing the pivot pin.

FIGS. 3-4 show that the front end 56 of the control rod 54 is connected to a front pivot assembly 60. The front pivot assembly 60 has a front pivot arm 61 having a pivot pin 62. Cotter pin 64 holds the front end 56 of the control rod 54 and the front pivot arm 61 to the pivot pin 62. The front pivot arm 61 has a front axle opening 66 which is fixedly attached to the front axle 20 and two wheel holes 68 either one of which receives a front wheel (16 as shown in FIG. 1). In accordance with this embodiment and with reference to FIGS. 1-2, the front pivot assembly 60 has another front pivot arm (not shown) attached similarly to the front axle 20 and similarly receiving a front wheel 16 on the right side 15 of the body 12.

Figure 5:
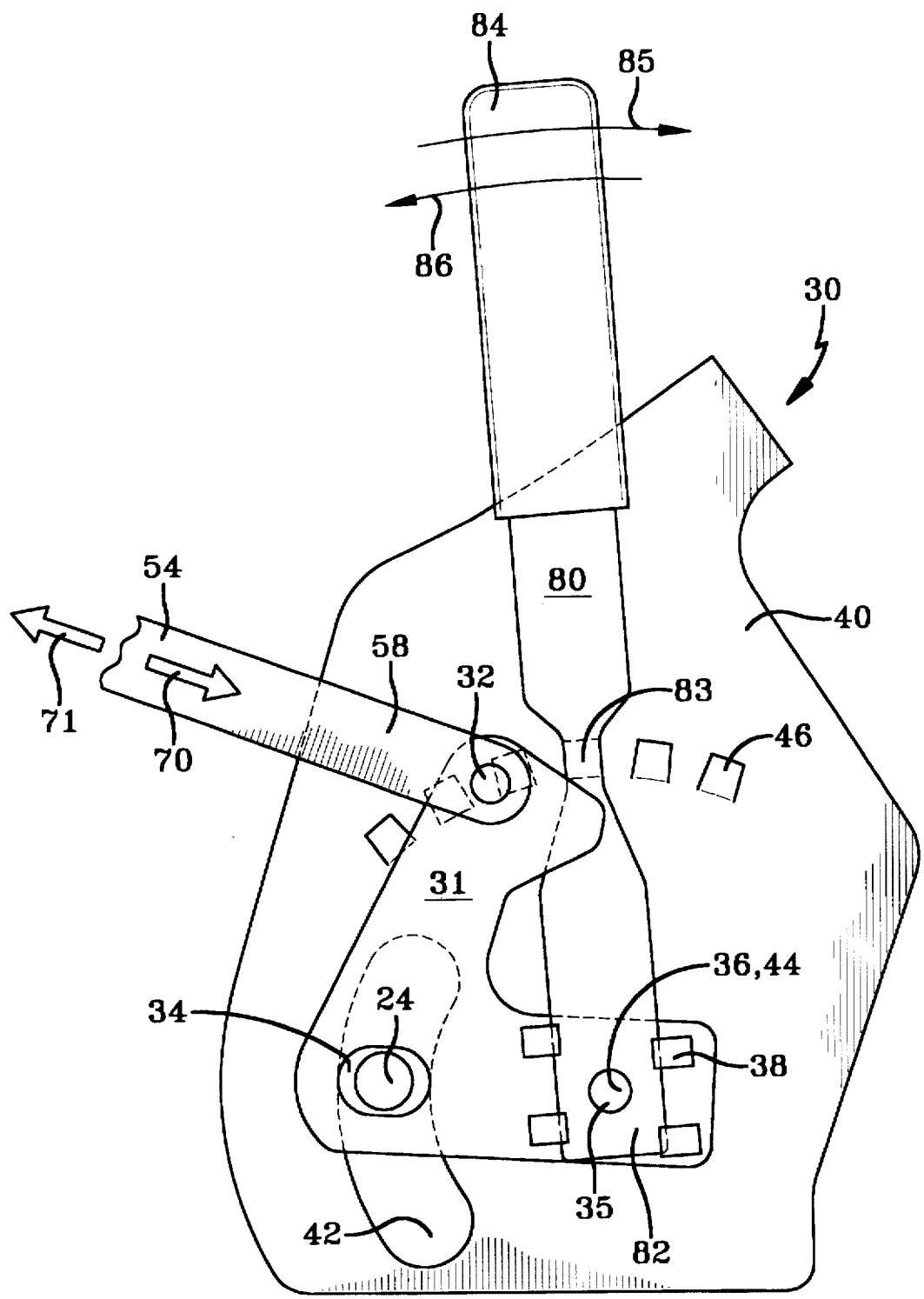
FIG. 5 shows the back pivot assembly, the adjustment bracket; and, the adjustment lever used is this invention.

FIG. 5 shows that the back end 58 of the control rod 54 is connected to a back pivot assembly 30. The back pivot assembly 30 has a back pivot arm 31 having a pivot pin 32. A cotter pin (not shown) holds the back end 58 of the control rod 54 and the back pivot arm 31 to the pivot pin 32. The back pivot arm 31 has an axle slot 34 for receiving back axle 24 which is free to rotate within axle slot 34. Back pivot arm 31 is free to rotate about pivot hole 36 which receives a pivot bolt 35. Back pivot arm 31 also has protrusions 38 which hold the lower end 82 of adjustment lever 80. Adjustment bracket 40 is fixedly attached to the mower body (12 as shown in FIG. 1) by any means known in the art. FIG. 5 shows that the adjustment bracket 40 has an axle slot 42 for receiving back axle 24 and a hole 44 for receiving pivot bolt 35. The adjustment lever 80 is secured to the adjustment bracket 40 by securing means as will now be discussed. Adjustment teeth 46 are used for adjusting the position of adjustment lever 80. Adjustment lever 80 has a upper end 84 which is cylindrically shaped and serves as an operator handle. The adjustment lever 80 also includes mid-section 83 and a lower end 82 which is fixedly attached to back pivot arm 31. Adjustment lever 80 is oriented so that it is biased against the adjustment bracket 40 so that it acts as a spring, maintaining an adequate force at the mid-section 83 against the adjustment bracket 40.

With continuing reference to FIGS. 1, 2, 4 and 5, to lower the mower body, as well as the mower blade, closer to the lawn 11, the operator moves the adjustment lever 80 in a clockwise direction 85. When the desired mower height has been achieved, the operator releases the adjustment lever 80 and it springs back against the corresponding tooth 46 of the adjustment bracket 40. When the operator moves the adjustment lever 80, it pivots about pivot bolt 35 causing the back pivot arm 31 to pivot about pivot bolt 35 also. As the back pivot arm 31 pivots, back axle 24 is raised within the axle slot 42 on the adjustment bracket 40 and within the back axle slots 22 of the mower body 12. As the back pivot arm 31 pivots, it exerts a backward force 70 on control rod 54. With reference to FIG. 4, this backward force 70 causes front pivot arm 61 to pivot about the front axle opening 66 in a clockwise direction 72. The front axle 20 rotates in the same clockwise direction 72 causing the other front pivot arm (not shown) attached similarly to the front axle 20 and also holding a front wheel (not shown) to rotate similarly. As the front pivot arm 61 pivots, the wheel holes 68 are raised, raising the front wheels 16 relative to the mower body 12. Thus, moving the adjustment lever 80 in a clockwise direction 85 causes both the back wheels 14 and the front wheels 16 to likewise move in a clockwise direction, 85 and 72 respectively, lowering the mower body 12 closer to the lawn 11.

In a similar way, with reference to FIG. 1, 2 and 5, to raise the mower body, as well as the mower blade, farther from the lawn 11, the operator moves the adjustment lever 80 in a counter-clockwise direction 86. Again, the adjustment lever 80 pivots about pivot bolt 35 causing the back pivot arm 31 to pivot about pivot bolt 35 also. As back pivot arm 31 pivots, back axle 24 is lowered within the axle slot 42 on the adjustment bracket 40 and within the back axle slots 22 of the mower body 12. The backward pivoting back pivot arm 31 exerts a frontward force 71 on control rod 54. With reference to FIG. 4, this frontward force 71 causes front pivot arm 61 to pivot about the front axle opening 66 in a counter-clockwise direction 73. The front axle 20 rotates in the same counter-clockwise direction 73 causing the other front pivot arm (not shown) attached similarly to the front axle 20 and also holding a front wheel (not shown) to rotate similarly. As the front pivot arm 61 pivots, the wheel holes 68 are lowered, lowering the front wheels 16 relative to the mower body 12. Thus, with reference to FIGS. 1–5, moving the adjustment lever 80 in a counter-clockwise direction 86 causes both the back wheels 14 and the front wheels 16 to likewise move in a counter-clockwise direction, 86 and 73 respectively, raising the mower body 12 farther from the lawn 11.

It should be noted, with reference to FIGS. 1–2, that if the height of the mower is adjusted higher or lower, the front wheels 16, as well as the back axle 24 and back wheels 14 pivot in the same direction (clockwise or counter-clockwise) and by substantially the same amount. Thus, the wheel base dimension X1 remains substantially the same throughout any height adjustment.

In another embodiment of this invention and with reference to FIGS. 1–2 and 5, the back pivot assembly 30 has another adjustment bracket and back pivot arm (not shown) attached similarly to the rear axle 24 and similarly pivoting about a pivot bolt (not shown) on the right side 15 of the body 12.

Figure 6:
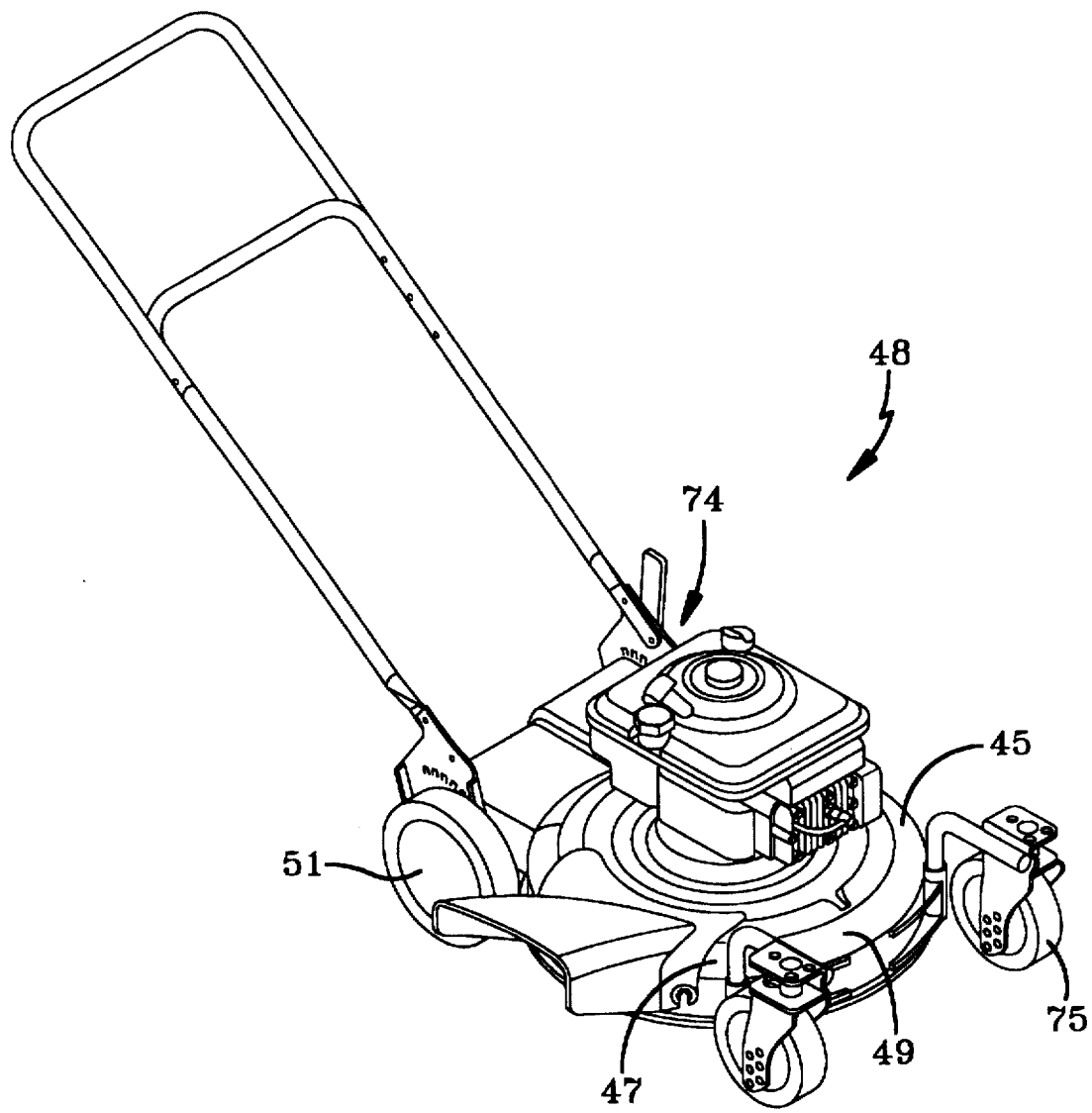
FIG. 6 shows a walk-behind mower using another embodiment of this invention. the single lever one axle height adjustment mechanism; and, FIG. 7 shows the back pivot assembly, the adjustment bracket, and the adjustment lever used with the single lever one axle height adjustment mechanism.
Figure 7:
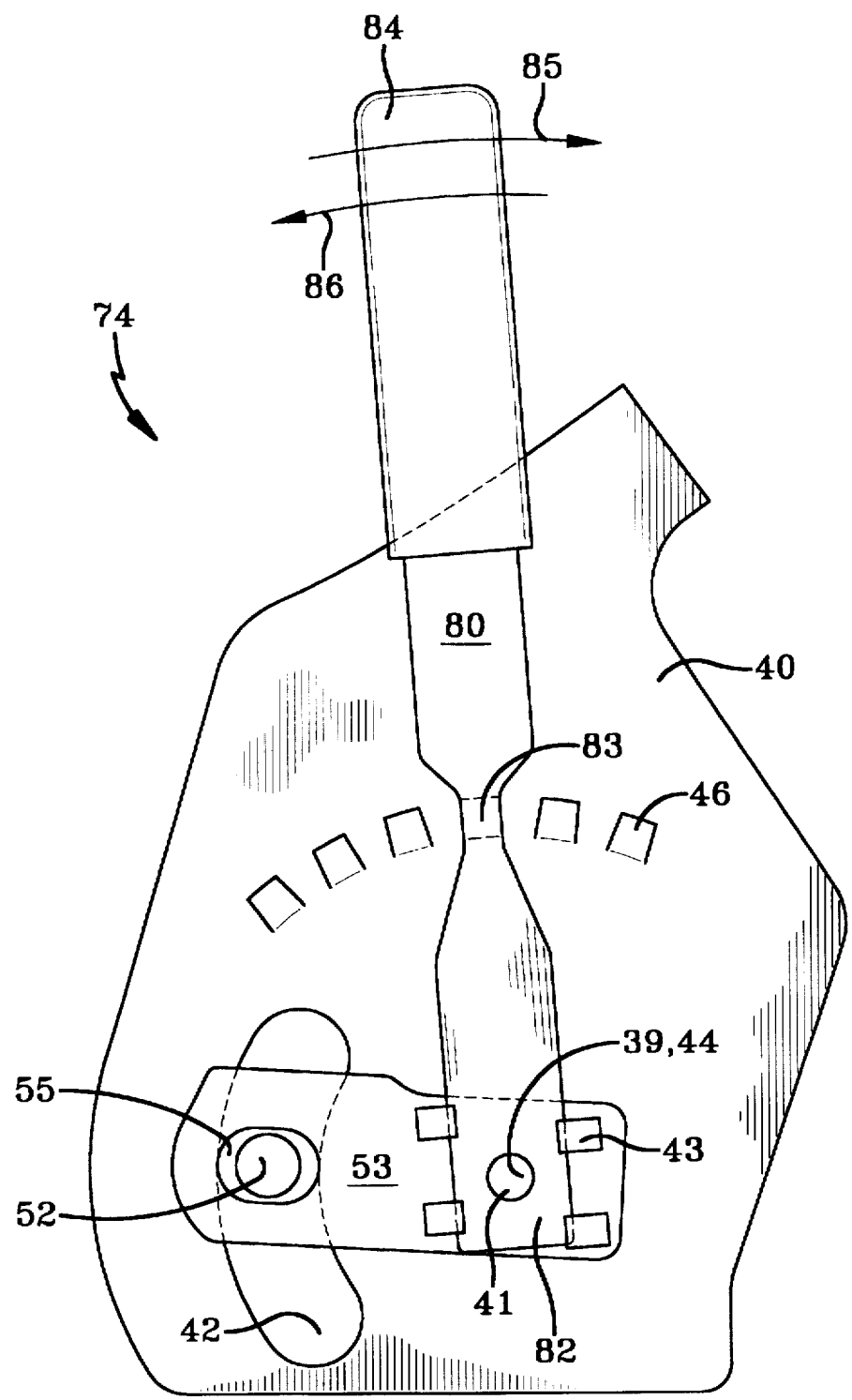

FIGS. 6–7 show a lawn mower 48, having a blade (not shown) which is equipped with another embodiment of the present invention, a single lever one axle height adjustment mechanism 74. This embodiment includes a walk-behind lawn mower 48 which uses pivoting wheels 75 in the front. This embodiment is used on a walk-behind lawn mower but the invention is also applicable to riding mowers, off the road vehicles, different terrains, and other applications as well. The lawn mower 48 also has a body 49 with a right side 47 and a left side 45 and back wheels 51 attached to the back axle (not shown). The single lever one axle height adjustment mechanism 74, shown mounted on the left side 45 of the mower body 49, is very similar to the single lever two axle height adjustment 50. Both have the spring assembly 26. The primary difference between them is that the single lever one axle height adjustment mechanism 74 does not use a control bar 54 and has no contact with the front wheels 75.

FIGS. 6 and 7 show that the single lever one axle height adjustment mechanism 74 is operatively connected to back axle 52 and has a back pivot arm 53 with an axle slot 55 for receiving back axle 52. Back pivot arm 53 is free to rotate about pivot hole 39 which receives a pivot bolt 41. Back pivot arm 53 also has protrusions 43 which hold the lower end 82 of adjustment lever 80. Adjustment bracket 40 is fixedly attached to the mower body 49 by any means known in the art. FIG. 7 shows that the adjustment bracket 40 has an axle slot 42 for receiving back axle 52 and a hole 44 for receiving pivot bolt 41. The adjustment lever 80 is secured to the adjustment bracket 40 by securing means as mentioned above.

With continuing reference to FIG. 7, to adjust the mower body, as well as the mower blade, in relation to the lawn (not shown), the operator moves the adjustment lever 80 in a clockwise direction 85 or counter-clockwise direction 86. When the operator moves the adjustment lever 80, it pivots about pivot bolt 41 causing the back pivot arm 53 to pivot about pivot bolt 41 also. As the back pivot arm 53 pivots, back axle 52 is raised or lowered within the axle slot 42 on the adjustment bracket 40 and within the back axle slots 22 of the mower body 12.

With reference to FIGS. 6–7, in another embodiment of this invention the single lever one axle height adjustment mechanism 74 has another adjustment bracket and back pivot arm (not shown) attached similarly to the rear axle 52 and similarly pivoting about a pivot bolt (not shown) on the right side 47 of the body 49.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention,
What is claimed is:

1. A height adjustment mechanism for adjusting the height of an associated apparatus at one axle, the apparatus having a body and an axle, the body having a first side with a first axle slot and a second side with a second axle slot, the axle having a first end rotatably received within the first axle slot of the body and a second end rotatably received within the second axle slot of the body, the height adjustment mechanism comprising:

a first adjustment bracket, said first adjustment bracket being fixedly attached to the first side of the body, said first adjustment bracket having a third axle slot for rotatably receiving the first end of the axle;

a first pivot assembly having a first pivot arm and a first pivot bolt, said first pivot arm having a fourth axle slot for rotatably receiving the first end of the axle, said first pivot arm also having a first pivot hole, said first pivot bolt fixedly attached to the first side of the body, said first pivot bolt extending through said first pivot hole of said first pivot arm, said first pivot arm selectively pivotable about said first pivot bolt;

adjusting means for selectively adjusting said first pivot assembly; and, securing means for securing said adjusting means to said first adjustment bracket.

2. The height adjustment mechanism of claim 1 wherein said adjusting means comprises:

an adjustment lever, said adjustment lever being fixedly connected to said first pivot arm, said adjustment lever having a third pivot hole rotatably receiving said first pivot bolt, said adjustment lever selectively pivotable about said first bolt.

3. The height adjustment mechanism of claim 2 wherein said adjustment lever has a lower end, said first pivot arm further comprising:

protrusions, said protrusions for holding said lower end of said adjustment lever.

4. The height adjustment mechanism of claim 2 wherein said first adjustment bracket further comprises:

adjustment teeth, said adjustment teeth for use in adjusting the position of said adjustment lever.

5. The height adjustment mechanism of claim 2 wherein said adjustment lever is biased against said first adjustment bracket.

6. The height adjustment mechanism of claim 1 wherein said first adjustment bracket has a fourth pivot hole receiving said first pivot bolt.

7. The height adjustment mechanism of claim 1 further comprising:

a second adjustment bracket, said second adjustment bracket being fixedly attached to the second side of the body, said second adjustment bracket having a fifth axle slot for rotatably receiving the second end of the axle; and, a second pivot assembly having a second pivot arm and a second pivot bolt, said second pivot arm having a sixth axle slot for rotatably receiving the second end of the axle, said second pivot arm also having a second pivot hole, said second pivot bolt fixedly attached to the first side of the body, said second pivot bolt extending through said second pivot hole of said second pivot arm, said second pivot arm selectively pivotable about said second pivot bolt.

8. The height adjustment mechanism of claim 1 further comprising:

a spring assembly, said spring assembly for lift assistance.

9. A height adjustment mechanism for adjusting the height of an associated apparatus at one axle, the apparatus having a body and an axle, the body having a first side with a first axle slot and a second side with a second axle slot, the axle having a first end rotatably received within the first axle slot of the body and a second end rotatably received within the second axle slot of the body, the height adjustment mechanism comprising:

a first adjustment bracket, said first adjustment bracket being fixedly attached to the first side of the body, said first adjustment bracket having a third axle slot for rotatably receiving the first end of the axle;

a first pivot assembly having a first pivot arm and a first pivot bolt, said first pivot arm having a fourth axle slot for rotatably receiving the first end of the axle, said first pivot arm also having a first pivot hole, said first pivot bolt fixedly attached to the first side of the body, said first pivot bolt extending through said first pivot hole of said first pivot arm, said first pivot arm selectively pivotable about said first pivot bolt, adjusting means for selectively adjusting said first pivot assembly, securing means for securing said adjusting means to said first adjustment bracket; and, a spring assembly, said spring assembly for lift assistance and including a spring having first and second ends;

a spring rod for supporting said spring, said spring rod fitting within said spring, said spring rod having first and second ends; and, a spring bracket for supporting said spring rod, said spring bracket having first and second openings for receiving said first and second ends of said spring rod, said spring bracket being fixedly attached to the body, said first end of said spring being operatively associated with the axle, said second end of said spring being operatively connected with said spring bracket.

10. A height adjustment mechanism for adjusting the height of an associated apparatus at two axles, the apparatus having front and back axles each having first and second ends, the apparatus also having a body with first and second sides each having a front axle opening and a back axle slot, the first and second ends of the front axle received within the front axle openings of the first and second sides, the first and second ends of the back axle rotatably received within the back axle slots of the first and second sides, the height adjustment mechanism comprising:

a first adjustment bracket, said first adjustment bracket being fixedly attached to the first side of the body, said first adjustment bracket having a third axle slot for rotatably receiving the first end of the back axle;

a first back pivot assembly having a first back pivot arm and a first back pivot bolt, said first back pivot arm having a first back arm axle slot for rotatably receiving the first end of the back axle, said first back pivot arm also having a first back pivot hole for rotatably receiving said first back pivot bolt, said first back pivot bolt operatively attached to the first side of the body, said first back pivot arm selectively pivotable about said first back pivot bolt;

a first front pivot arm having a first wheel hole for rotatably receiving an associated wheel, the first end of the front axle being fixedly connected to said first front pivot arm, said first front pivot arm pivotable about the first end of the front axle;

a second front pivot arm having a first wheel hole for rotatably receiving an associated wheel, the second end of the front axle being fixedly connected to said second front pivot arm, said second front pivot arm pivotable about the second end of the front axle;

connecting means for connecting said first back pivot arm to said first front pivot arm;

adjusting means for selectively adjusting said first back pivot assembly; and, securing means for securing said adjusting means to said first adjustment bracket.

11. The height adjustment mechanism of claim 10 wherein said first back and first front pivot arms each have a pin hole, said connecting means comprising:

a control rod having front and back ends, said front and back ends each having a pin hole;

a back pin, said back pin rotatably received by said pin hole of said first back pivot arm, said back pin also rotatably received by said pin hole of said back end of said control rod; and, a front pin, said front pin rotatably received by said pin hole of said first front pivot arm, said front pin also rotatably received by said pin hole of said front end of said control rod.

12. The height adjustment mechanism of claim 10 wherein said adjusting means comprises:

an adjustment lever, said adjustment lever being fixedly connected to said first back pivot arm, said adjustment lever having a third pivot hole rotatably receiving said first back pivot bolt, said adjustment lever selectively pivotable about said first back pivot bolt.

13. The height adjustment mechanism of claim 12 wherein said adjustment lever has a lower end, said first back pivot arm further comprising:

protrusions, said protrusions for holding said lower end of said adjustment lever.

14. The height adjustment mechanism of claim 12 wherein said first adjustment bracket further comprises:

adjustment teeth, said adjustment teeth for use in adjusting the position of said adjustment lever.

15. The height adjustment mechanism of claim 12 wherein said adjustment lever is biased against said first adjustment bracket.

16. The height adjustment mechanism of claim 10 wherein said first adjustment bracket has a fourth pivot hole receiving said first back pivot bolt.

17. The height adjustment mechanism of claim 10 further comprising:

a second adjustment bracket, said second adjustment bracket being fixedly attached to the second side of the body, said second adjustment bracket having a fifth axle slot for rotatably receiving the second end of the back axle; and, a second back pivot assembly having a second back pivot arm and a second back pivot bolt, said second back pivot arm having a second back arm axle slot for rotatably receiving the second end of the back axle, said second back pivot arm also having a second back pivot hole for rotatably receiving said second back pivot bolt, said second back pivot bolt operatively attached to the second side of the body, said second back pivot arm selectively pivotable about said second back pivot bolt.

18. The height adjustment mechanism of claim 10 further comprising:

a spring assembly, said spring assembly for lift assistance.

19. A height adjustment mechanism for adjusting the height of an associated apparatus at two axles, the apparatus having front and back axles each having first and second ends, the apparatus also having a body with first and second sides each having a front axle opening and a back axle slot, the first and second ends of the front axle received within the front axle openings of the first and second sides, the first and second ends of the back axle rotatably received within the back axle slots of the first and second sides, the height adjustment mechanism comprising:

a first adjustment bracket, said first adjustment bracket being fixedly attached to the first side of the body, said first adjustment bracket having a third axle slot for rotatably receiving the first end of the back axle;

a first back pivot assembly having a first back pivot arm and a first back pivot bolt, said first back pivot arm having a first back arm axle slot for rotatably receiving the first end of the back axle, said first back pivot arm also having a first back pivot hole for rotatably receiving said first back pivot bolt, said first back pivot bolt operatively attached to the first side of the body, said first back pivot arm selectively pivotable about said first back pivot bolt;

a first front pivot arm having a first wheel hole for rotatably receiving an associated wheel, the first end of the front axle being fixedly connected to said first front pivot arm, said first front pivot arm pivotable about the first end of the front axle;

a second front pivot arm having a first wheel hole for rotatably receiving an associated wheel, the second end of the front axle being fixedly connected to said second front pivot arm, said second front pivot arm pivotable about the second end of the front axle;

connecting means for connecting said first back pivot arm to said first front pivot arm;

adjusting means for selectively adjusting said first back pivot assembly;

securing means for securing said adjusting means to said first adjustment bracket; and, a spring assembly, said spring assembly for lift assistance and including a spring having first and second ends;

a spring rod for supporting said spring, said spring rod fitting within said spring, said spring rod having first and second ends; and, a spring bracket for supporting said spring rod, said spring bracket having first and second openings for receiving said first and second ends of said spring rod, said spring bracket being fixedly attached to the body, said first end of said spring being operatively associated with the back axle, said second end of said spring being operatively connected with said spring bracket.

20. A method for selectively adjusting the height of an associated apparatus at two axles, the apparatus having a body and front and back axles each with first and second ends, the first and second ends of the back axle each receiving a back wheel, the method using a height adjustment mechanism which includes first and second front pivot arms, the first and second ends of the front axle fixedly attached to the first and second front pivot arms, the first and second front pivot arms receiving first and second front wheels, the method comprising the steps of:

positioning an adjustment lever to a position corresponding to the desired apparatus height;

pivoting a back pivot arm about a back pivot bolt;

pivoting the back axle about the back pivot bolt thereby adjusting the height of the back wheels relative to the body;

exerting a force on a control rod having front and back ends, said back end of said control rod being operatively connected to said back pivot arm and said front end of said control rod being operatively connected to the first front pivot arm;

pivoting the first front pivot arm about the front axle thereby adjusting the height of the first front wheel relative to the body;

rotating the front axle; and, pivoting the second front pivot arm about the front axle thereby adjusting the height of the second front wheel relative to the body.

21. The method of claim 20 wherein the height adjustment mechanism also has a spring for lift assistance, the method adding a step after the step of pivoting a back pivot arm about a back pivot bolt, the additional step being:

applying lift assist spring force to the back axle.

* * * * *